US008212853B2

(12) United States Patent  
Lin et al.

(10) Patent No.: US 8,212,853 B2
(45) Date of Patent: Jul. 3, 2012

(54) INSTANT VIDEO MESSAGING SYSTEM AND INSTANT VIDEO MESSAGING METHOD THEREOF

(75) Inventors: Wen-Hwa Lin, Taipei Hsien (TW); Chun-Nan Yeh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 956 days.

(21) Appl. No.: 12/208,584

(22) Filed: Sep. 11, 2008

(65) Prior Publication Data

US 2009/0195637 A1    Aug. 6, 2009

(30) Foreign Application Priority Data

Feb. 1, 2008  (CN) .......................... 2008 1 0300307

(51) Int. Cl.
    *H04N 7/14* (2006.01)
(52) U.S. Cl. .................................. 348/14.01; 348/14.12
(58) Field of Classification Search ............... 348/14.01, 348/14.02, 14.03, 14.07–14.15, 208.12, 108.99, 348/345, 326; 370/259, 260; 382/103, 291, 382/293, 294; 709/204; 379/88.13
    See application file for complete search history.

(56) References Cited

U.S. PATENT DOCUMENTS

| 7,027,622 | B2 | 4/2006 | Pengwu |
| 7,826,527 | B2 | 11/2010 | Wang |
| 2006/0271632 | A1* | 11/2006 | Livingood ..................... 709/206 |
| 2007/0214461 | A1* | 9/2007 | Glatron et al. ................. 719/321 |
| 2009/0010465 | A1* | 1/2009 | Boguslavskij et al. ....... 381/315 |

FOREIGN PATENT DOCUMENTS

| TW | 569148 B | 1/2004 |
| TW | I279143 B | 4/2007 |
| TW | 200745971 | 12/2007 |

* cited by examiner

*Primary Examiner* — Tuan Nguyen
(74) *Attorney, Agent, or Firm* — Altis Law Group, Inc.

(57) ABSTRACT

The instant video messaging system includes a display unit, an image capture unit, and a capture adjustment sub-system. The display unit is configured to display consecutive images transmitted from a remote end via a network. The image capture unit is configured to capture the consecutive images in a predetermined area. The capture adjustment sub-system is connected to the display unit and the image capture unit and configured to locate select subject aspects, determine if the select subject aspects comply with a predetermined presentation, adjust the select subject aspects of the captured images, and transmit the consecutive images to the remote end via the network.

16 Claims, 4 Drawing Sheets

INSTANT VIDEO MESSAGING SYSTEM AND INSTANT VIDEO MESSAGING METHOD THEREOF

BACKGROUND

1. Technical Field

The invention relates to an instant video messaging system and an instant video messaging method thereof.

2. Description of the Related Art

An instant video messaging system offers real-time communication and allows easy visual collaboration. A typical instant video messaging system includes a video camera for video input, and a display for video output. The video camera is oriented to capture information in front of the display at a fixed angle, assuming that the subject is always viewed from that angle. However, the subject will generally move while conferring, thus deviating from the fixed angle and resulting in inferior video quality.

Therefore, it is desirable to provide an instant video messaging system and method thereof, which can overcome the above-mentioned problem.

BRIEF DESCRIPTION OF THE DRAWINGS

Many aspects of the present instant video messaging system and method thereof should be better understood with reference to the following drawings. The components in the drawings are not necessarily drawn to scale, the emphasis instead being placed upon clearly illustrating the principles of the present instant video messaging system and method thereof. Moreover, in the drawings, like reference numerals designate corresponding parts throughout the several views.

DETAILED DESCRIPTION OF THE EMBODIMENTS

Embodiments of an instant video messaging (IVM) system and method thereof will now be described in detail with reference to the drawings.

Figure 1:
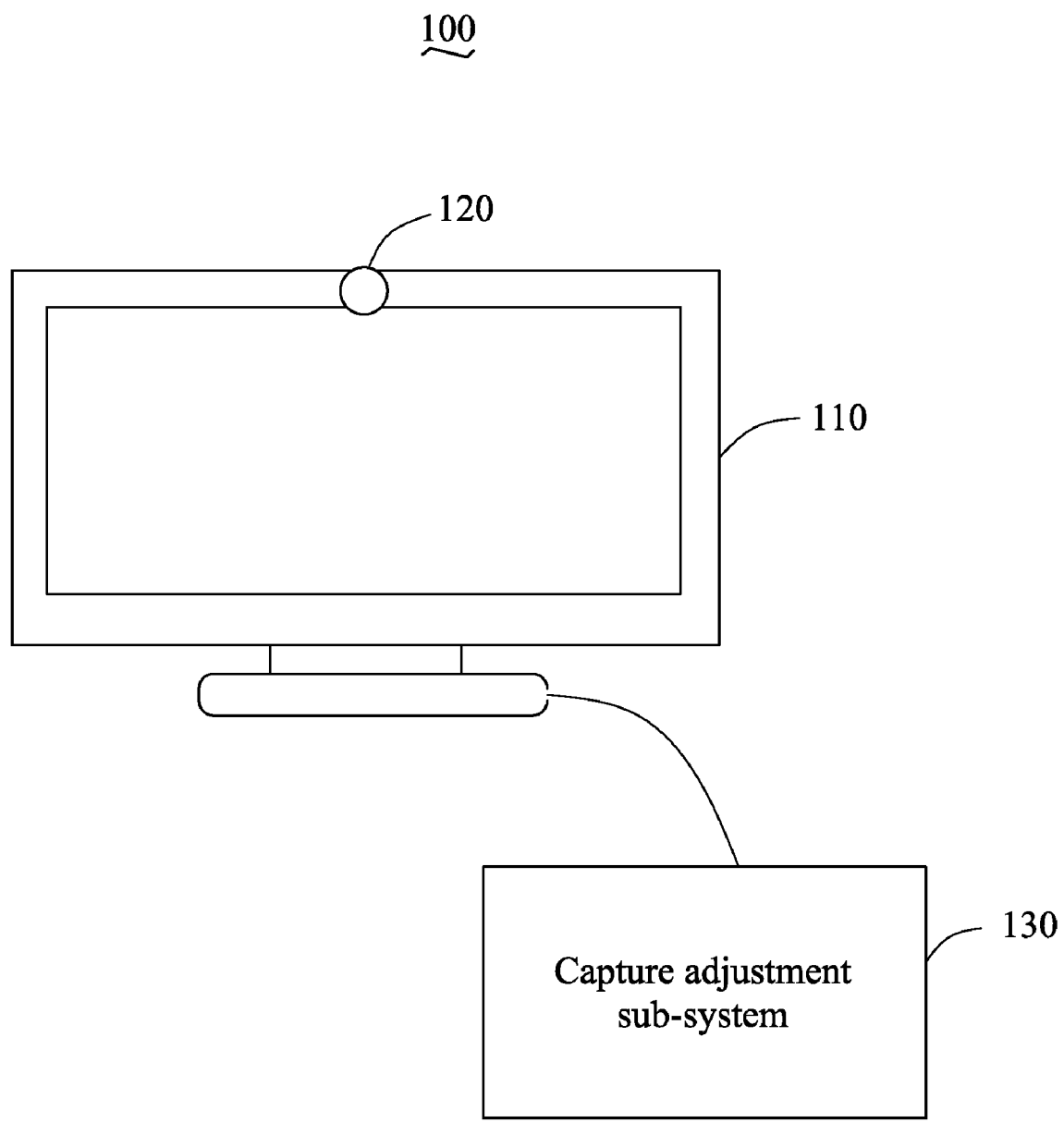
FIG. 1 is a schematic view of one embodiment of an instant video messaging system.

Referring to FIG. 1, an embodiment of an IVM system 100 includes a display unit 110, an image capture unit 120, and a capture adjustment sub-system 130.

The display unit 110 is configured to output video, such as displaying video transmitted from a remote end via a network, for example, the internet. The image capture unit 120 is configured to capture information in a predetermined area, such as video data. The information contains subject information corresponding to a position in the predetermined area. The information includes a number of consecutively captured images of the subject. The display unit 110 may be a liquid crystal display (LCD).

Figure 2:
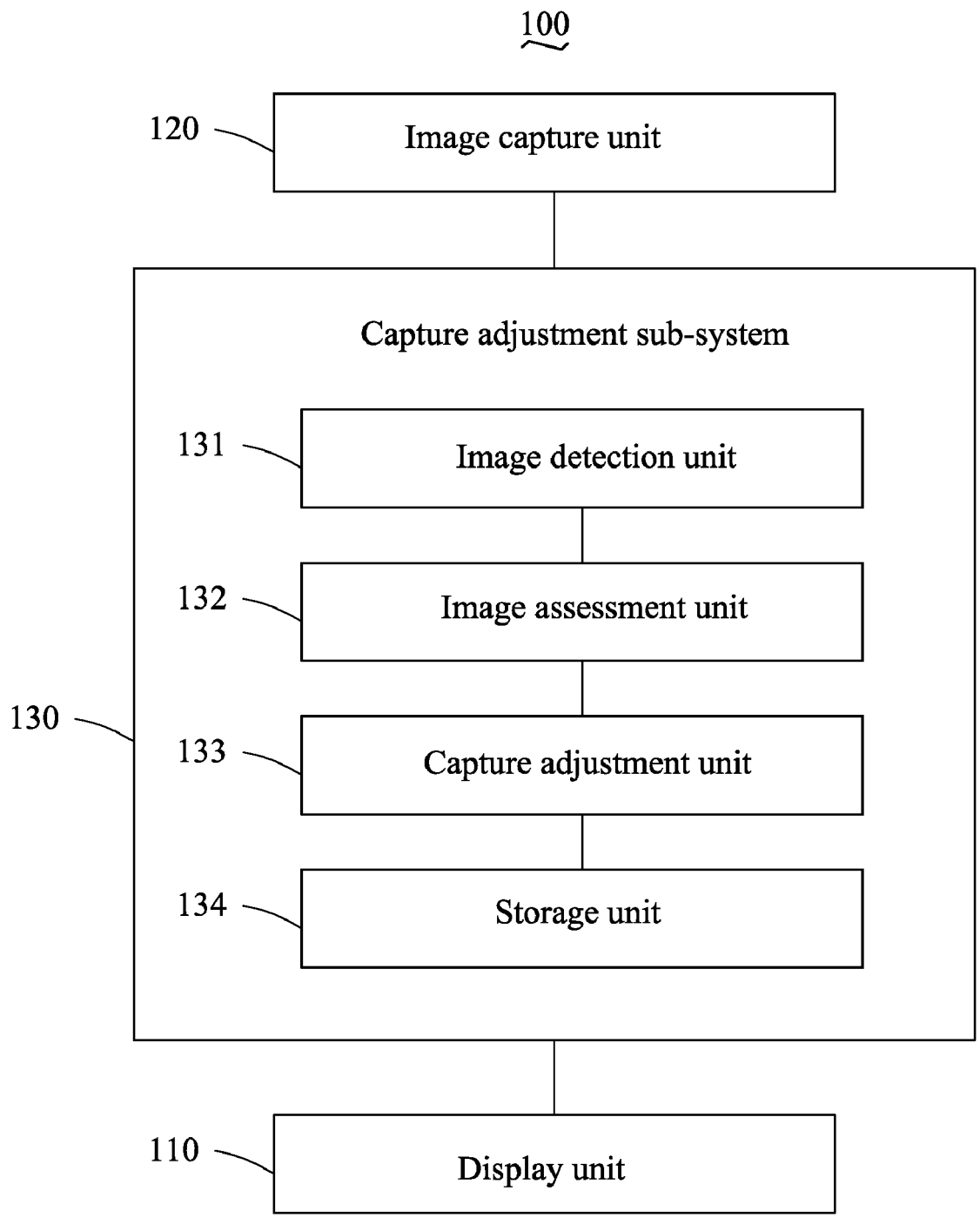
FIG. 2 is a functional block diagram of the instant video messaging system of FIG. 1.

Referring also to FIG. 2, the capture adjustment sub-system 130 may include an image detection unit 131, an image assessment unit 132, a capture adjustment unit 133, and a storage unit 134. The image detection unit 131 is configured to locate select subject aspects from the captured images and obtain coordinates thereof in an XY-Cartesian coordinate.

Many detection algorithms, such as a nerve network, a nerve network plus fast Fourier transform, a fuzzy plus nerve network, RGB normalized color, fuzzy color, principle component analysis, and algorithm template may be used by the image detection unit 131. The image assessment unit 132 is configured to interpolate the select subject aspects using the coordinates of contours thereof and determine if the select subject aspects are distorted. In particular, the interpolation values a, b of the select subject aspects can be calculated according to an equation of a standard ellipse: $x^2/a^2+y^2/b^2=1$, where a and b also represent radii of the ellipse on the x and y axes and can be calculated using the coordinates of the select subject aspects. If the select subject aspects are not distorted, the contours follow a predetermined ratio between the interpolation values a/b, such as about $2/3$, in which the select subject aspects are in an acceptable position and no adjustment is needed. If the ratio deviates significantly from the predetermined ratio, the select subject aspects are in an unfavorable orientation and adjustment is required. For example, if a subject's face moves downwards, deviating from the central focus of the video camera, the ratio of the interpolation values a/b may reach about 1. The capture adjustment unit 133 is configured to adjust the select subject aspects to fit predetermined coordinates accessed from the storage unit 134 corresponding to an acceptable ratio value. The storage unit 134 is configured to temporarily store the predetermined coordinate values and adjusted subject images, for transmission to a remote end via a network for subsequent display on that end.

In one embodiment, components of the instant video messaging system 100 may be software instructions written via software languages such as C, C++, and Java.

Figure 3:
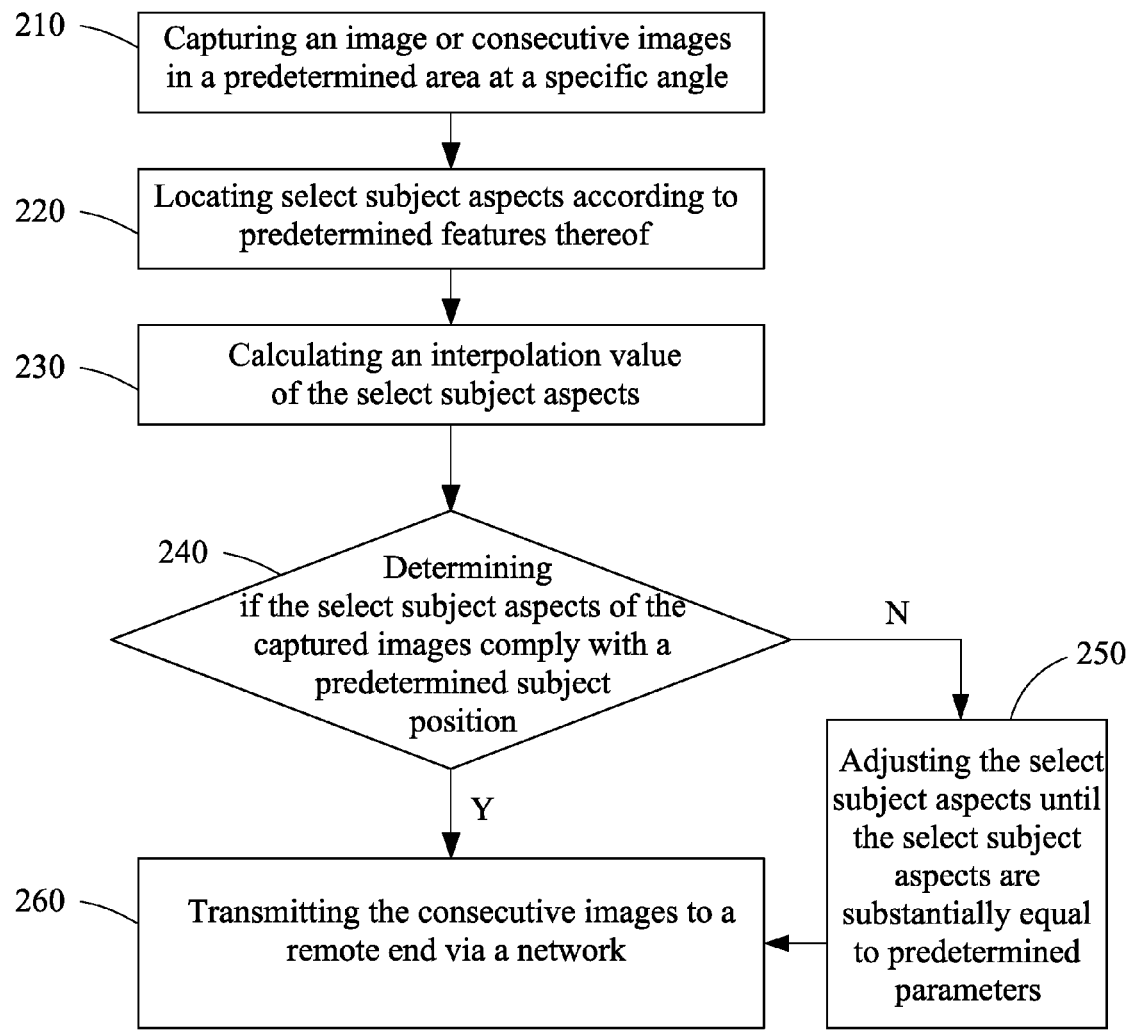
FIG. 3 is a flowchart of one embodiment of an instant video messaging method of the instant video messaging system of FIG. 1.

Referring to FIG. 3, an embodiment of an instant video messaging method, may be performed by, for example, the IVM system 100 of FIG. 1. Depending on the embodiment, certain of the steps described below may be removed, others may be added, and the sequence of steps may be altered.

In a step 210, an image or consecutive images from an immediate area in a predetermined area are captured at a specific angle by the image capture unit 120. The image contains select subject aspect or aspects. If the IVM system 100 is implemented, image capture is executed by the image capture unit 120, such as a webcam.

Continuing to a step 220, the select subject aspect is located according to predetermined features. Step 220 may be carried out by the image detection unit 131. Detection algorithms employed can include nerve network, nerve network plus fast Fourier transform, fuzzy plus nerve network, RGB normalized color, fuzzy color, principle component analysis, and algorithm template.

Moving to a step 230, an interpolation value of the select subject aspects is calculated. The select subject aspects are evaluated according to the equation of the standard ellipse in an XY-Cartesian coordinate system: $x^2/a^2+y^2/b^2=1$. For example, the select subject aspects such as an oval shape regarded as a predetermined presentation image pre-stored in the storage unit 134 represents a suitable subject position according to a predetermined interpolation value $a=2/3b$. If the subject aspect moves downwardly out of the suitable subject position, the circle represented by the unsuitable position according to the interpolation value $a=b$ is detected as larger than the predetermined interpolation value $a=2/3b$. Step 230 may be carried out by the image assessment unit 132.

Continuing to a decision step 240, if the select subject aspects of the captured images comply with the predetermined subject position accessed from the storage unit 134, the determining unit 132 deems the position "suitable," and the method continues to a step 260. If the select subject aspects are detected as noncompliant, for example, circular, then the subject position is deemed "unsuitable", and a step 250 is executed. Step 240 may be executed by the image assessment unit 132.

In the step 250, the select subject aspects are adjusted until the selected subject aspects are substantially equal to the predetermined parameters. Step 250 may be executed by the capture adjustment unit 133, and in particular, by steps 251 through 260 shown in FIG. 4.

Figure 4:
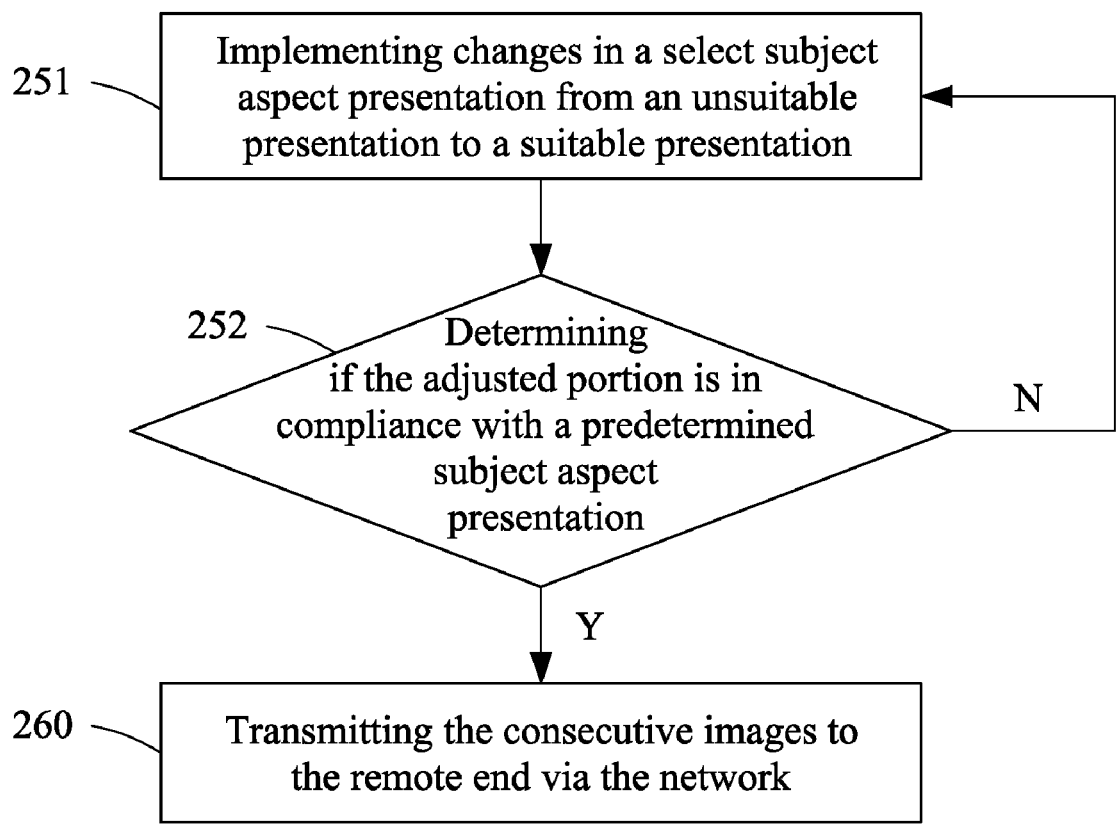
FIG. 4 is a detailed flowchart of step 250 of the instant video messaging method of FIG. 3.

Referring also to FIG. 4, in a step 251, changes in select subject aspect presentation from an unsuitable presentation to a suitable presentation are implemented by changing the interpolation value of the select subject aspects to update a new interpolation value, for example a=⅔b.

Continuing to a decision step 252, if the adjusted portion is in compliance with a predetermined subject aspect presentation accessed from the storage unit 134, the method continues to step 260. If not in compliance, step 251 is repeated.

In the step 260, the consecutive images with the adjusted subject aspects are transmitted to the remote end via the network.

The disclosed instant video messaging system provides the adjusted subject aspects to maintain suitable presentation thereof despite anomalies in the actual subject's presentation.

It will be understood that the above particular embodiments and methods are shown and described by way of illustration only. The principles and the features of the embodiments may be employed in various and numerous embodiment thereof without departing from the scope of the invention as claimed. The above-described embodiments illustrate the scope of the invention but do not restrict the scope of the invention.

What is claimed is:

1. An instant video messaging system, comprising:
    a display unit displaying configured for displaying consecutive images transmitted from a remote end via a network;
    an image capture unit configured for capturing the consecutive images in a predetermined area; and
    a capture adjustment sub-system connected to the display unit and the image capture unit, the capture adjustment sub-system configured for locating select subject aspects, determining if the located select subject aspects comply with a predetermined aspect presentation, adjusting the select subject aspects of the captured images, and transmitting the consecutive images to the remote end via the network.

2. The instant video messaging system as claimed in claim 1, wherein the capture adjustment sub-system comprises a storage unit temporarily storing select subject aspect images and the adjusted subject aspect images for transmission to the remote end via the network.

3. The instant video messaging system as claimed in claim 1, wherein the display unit is a liquid crystal display panel.

4. The instant video messaging system as claimed in claim 1, wherein the image capture unit is a web camera.

5. The instant video messaging system as claimed in claim 1, wherein the capture adjustment sub-system comprises:
    an image detection unit configured for locating the select subject aspects of the captured images according to preset presentation standards;
    an image assessment unit configured for calculating interpolation values of the select subject aspects and determining if the select subject aspect images comply with a predetermined subject aspect presentation;
    a capture adjustment unit configured for adjusting the select subject aspects to comply with the predetermined subject aspect presentation; and
    a storage unit configured for temporarily storing the consecutive images for transmission to the remote end via the network for displaying.

6. An instant video messaging method of an instant video messaging system, the method comprising:
    capturing consecutive images;
    locating select subject aspects of the captured images according to preset parameters;
    calculating interpolation values of the select subject aspects;
    determining if the select subject aspects of the captured images comply with a predetermined subject aspect presentation;
    adjusting the select subject aspects until the select subject aspects are substantially equal to the predetermined subject aspect presentation, if the select subject aspects of the captured images do not comply with the predetermined presentation; and
    transmitting the consecutive images to a remote end via a network for displaying.

7. The instant video messaging method as claimed in claim 6, wherein the consecutive images are immediately transmitted to the remote end via the network if the select subject aspects comply with the predetermined subject aspect presentation.

8. The instant video messaging method as claimed in claim 6, wherein the interpolation values are calculated according to an equation of a standard ellipse: $x^2/a^2+y^2/b^2=1$, where a, b represent radii.

9. The instant video messaging method as claimed in claim 8, wherein the interpolation values corresponding to the predetermined subject aspect presentation are a basic shape represented as ratios.

10. The instant video messaging method as claimed in claim 6, wherein the predetermined subject aspect presentation is pre-stored in a storage unit.

11. The instant video messaging method as claimed in claim 6, wherein the consecutive images are captured by an image capture unit.

12. The instant video messaging method as claimed in claim 1, wherein the image capture unit is a webcam.

13. The instant video messaging method as claimed in claim 6, wherein the select subject aspects of the captured images are located by an image detection unit.

14. The instant video messaging method as claimed in claim 6, wherein an image assessment unit determines if the adjusted subject aspect is compliant with the predetermined presentation.

15. The instant video messaging method as claimed in claim 6, wherein the adjusting the select subject aspects comprises:
    adjusting the select subject aspects in a captured image by changing the interpolation values of the select subject aspects to update new interpolation values;
    determining if the adjusted subject aspect is compliant with the predetermined subject aspect presentation; and
    transmitting the consecutive images with the adjusted subject aspects.

16. The instant video messaging method as claimed in claim 6, wherein the select subject aspects are adjusted by a capture adjustment unit.

* * * * *